United States Patent [19]

Loce et al.

[11] Patent Number: 4,868,587
[45] Date of Patent: Sep. 19, 1989

[54] IMAGE HALFTONING SYSTEM FOR PRINTERS

[75] Inventors: Robert P. Loce; Susan E. Feth, both of Rochester; William L. Lama; Richard F. Lehman, both of Webster, all of N.Y.

[73] Assignee: Xerox Corporation, Stamford, Conn.

[21] Appl. No.: 197,051

[22] Filed: May 20, 1988

[51] Int. Cl.⁴ .............................................. G01D 15/00
[52] U.S. Cl. .................................. 346/157; 346/154; 346/160
[58] Field of Search .................. 346/157, 160, 154; 358/298, 300; 364/518, 519

[56] References Cited

U.S. PATENT DOCUMENTS

| 4,078,929 | 3/1978 | Gundlach | 96/1.2 |
| 4,434,431 | 2/1984 | Ohkubo et al. | 346/154 |
| 4,491,875 | 1/1985 | Kawamura | 358/298 |
| 4,619,518 | 10/1986 | Kameyama et al. | 355/4 |
| 4,630,918 | 12/1986 | Yui et al. | 355/3 R |
| 4,651,287 | 3/1987 | Tsao | 364/519 |

OTHER PUBLICATIONS

Fundamentals of Digital Copiers; Canon—Oct. 1984.

Primary Examiner—Arthur G. Evans
Attorney, Agent, or Firm—Frederick E. McMullen

[57] ABSTRACT

Trinary and quaternary halftone reproduction systems for electronic printers in which discrete combinations of either three or four reflectance level pixels having optimum intermediate levels form halftone cells to provide an increased number of gray steps for processing image signals, yielding an optimum Tone Reproduction Curve.

9 Claims, 9 Drawing Sheets

Density Space

Munsell Space

Binary

Trinary
$R_2 = .526$

Quaternary
$R_2 = .367$,
$R_3 = .684$

IMAGE HALFTONING SYSTEM FOR PRINTERS

The invention relates to electronic printers, and more particularly to an improved image halftoning system for printers.

Conventional xerographic copiers do not render faithful or pleasing copies of continuous tone originals. The usual discharge characteristic of the photoconductor and solid area developability of the xerographic development system combine to yield a Tone Reproduction Curve (TRC) with a steep slope and a narrow range. The result is a copy with washed out highlights and overdeveloped shadows. The standard technique used to improve the gray scale reproduction is to expose the photoconductor through a transmissive screen to produce a fine, spatially modulated voltage pattern on the photoconductor. Development of this modulated pattern yields a Tone Reproduction Curve with a lower slope and an extended range of input gray scale that produces a corresponding change in the output. The result is a more faithful and pleasing copy.

A similar effect is found in the halftoning process employed by xerographic based printers in digital printing of pictures. There the image is formed of a texture pattern of black and white spots, which gives the impression of a gray when viewed at normal reading distance. If the halftone frequency and number of distinguishable halftone steps are both sufficiently high, the printed picture will be pleasing to the eye. Halftone methods employed in binary xerographic printers have traditionally been binary, that is, the laser writes with only two laser intensity levels; on and off.

When assessing the quality of a binary xerographic printer, two measures are important: the halftone frequency (i.e. number of halftone cells per linear inch), and the number of distinguishable gray steps. To produce a copy of a picture with a just acceptable degree of halftone graininess requires at least 65 halftone cells per inch measured along a diagonal of the page. Good quality halftones require about 100 cells/inch, while high quality magazines typically use 150 cells/inch or higher. The needed number of distinct gray steps in the pictorial copy depends on the eye's ability to distinguish closely spaced grays. It is found that the human eye at normal reading distance can detect a reflectance modulation of about 0.5% at a spatial frequency near 1 cy/mm. The inverse of this just perceptible modulation has been interpreted as the maximum number of gray steps that the eye can perceive. A rule of thumb in the printing industry is that an acceptable picture should contain about 65 gray steps. For good quality, 100 or more steps are desired.

However, in a binary printer, the maximum number of output gray steps is limited to the number of pixels per halftone cell (p), plus 1. Thus for a typical 8 by 4 rectangular halftone cell, $p+1=33$ output gray steps. Higher halftone frequencies have fewer pixels per cell and therefore produce fewer gray steps. This is the fundamental limitation of binary printers.

In the prior art, U.S. Pat. No. 4,078,929 to Gundlach discloses a two-color system in which a three level charge pattern is produced, for example, by modulating a laser beam to permit selective image developing by two color developers using positively and negatively charged toner particles. And, Fundamentals of Digital Copiers (Canon-Oct. 1984), discusses halftone density processing in which black and white pixels are arranged in cells in different combinations to provide a series of gray level steps. Additionally, this publication describes a trinary coding system in which the individual cell pixels, in addition to being either all white or all black, can also be composed of one-half white and one-half black. Another two color system is disclosed by U.S. Pat. No. 4,610,518 to Kameyama et al. In this patent, a two cycle process is used to print copies. During the first cycle of charge, exposure, and development, a first color image is made. During a later second cycle of charge, exposure, and development, a second color image is created on top of the first color image. Following this, the two color image that has been formed is transferred to a copy sheet. Another U.S. Pat. No. 4,434,431 to Ohkubo et al, discloses a multi-level printer having a control circuit for controlling a laser diode to vary the intensity of the beam output by the laser in response to multi-level image signals, while U.S. Pat. No. 4,651,287 to Tsao, discloses a system in which either the dot size or dot intensity of a laser beam is controlled in accordance with a preset algorithm in order to improve print accuracy. And, U.S. Pat. No. 4,630,918 to Yui et al, discloses a control for adjusting both the developer bias voltage and the exposure intensity for the purpose of controlling image contrast.

In contrast, the present invention uses a "multilevel" laser to expose pixels at more than one level of exposure. The resultant multilevel charge pattern is then developed to produce a high quality pictorial print. Using multilevel pixels as opposed to binary pixels results in a substantially greater number of unique halftone cells, the average reflectance of which is arrayed uniformly along a perceived brightness scale. To obtain these ideal cells, specific (optimum) pixel levels are used.

The present invention provides an improved cell structure for halftone processors comprising: a cell composed of pixels; the pixels being arranged in a predetermined pattern or pattern that best matches the input image so that the cell when viewed in its entirety provides a preset average gray level to the viewer; the individual pixels that comprise the cell having at least three different possible reflectance or brightness levels.

The invention further provides an image reproduction system having image data input means for scanning an original image and providing an input array of image data corresponding to the image gray scale levels of the picture element (pixel) locations of the original image; processing means for receiving the input array of image data and computing an output array of image print values, each of the print values corresponding to one of a fixed number of pixel reflectance levels values; the processing means including an array of halftone cells adapted to provide a stepwise series of reflectance levels through a succession of intermediate levels ranging from white to black, each of the cells having a plurality of pixels, the pixels having either a white, black, or gray reflectance level, the ratio of pixels having the gray reflectance level to the pixels having the black reflectance level or the ratio of pixels having the gray reflectance level to the pixels having the white reflectance level in each of the cells being chosen to provide a substantially uniformly changing series of average reflectance levels ranging from white to black in the array of halftone cells; and printing means capable of printing picture elements, each of the picture elements having a reflectance or brightness level corresponding to one of the white, black, or gray reflectance levels whereby to print the array of image print values corresponding to the gray scale values.

IN THE DRAWINGS

Figure 7A:
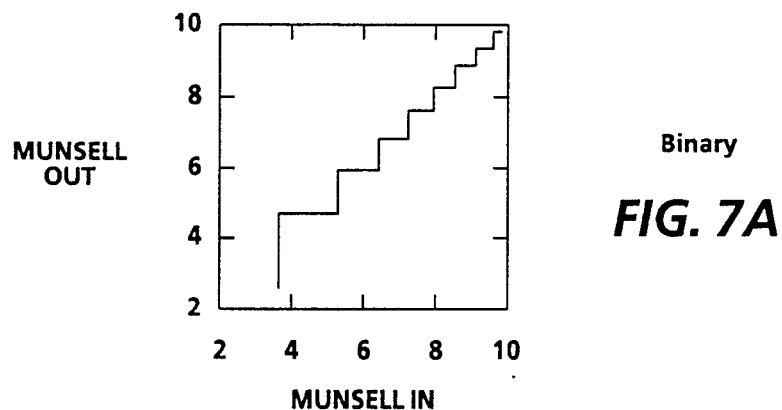
Figure 7B:
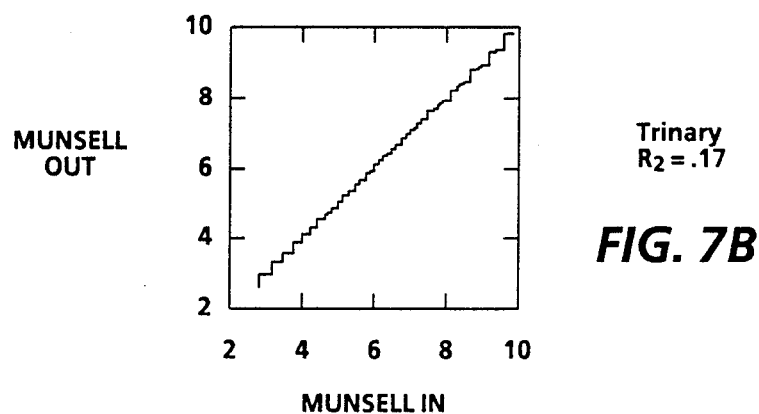
Figure 7C:
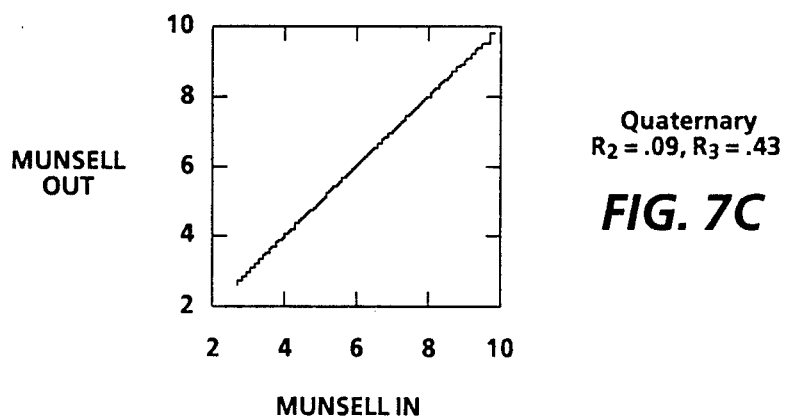
Figure 8:
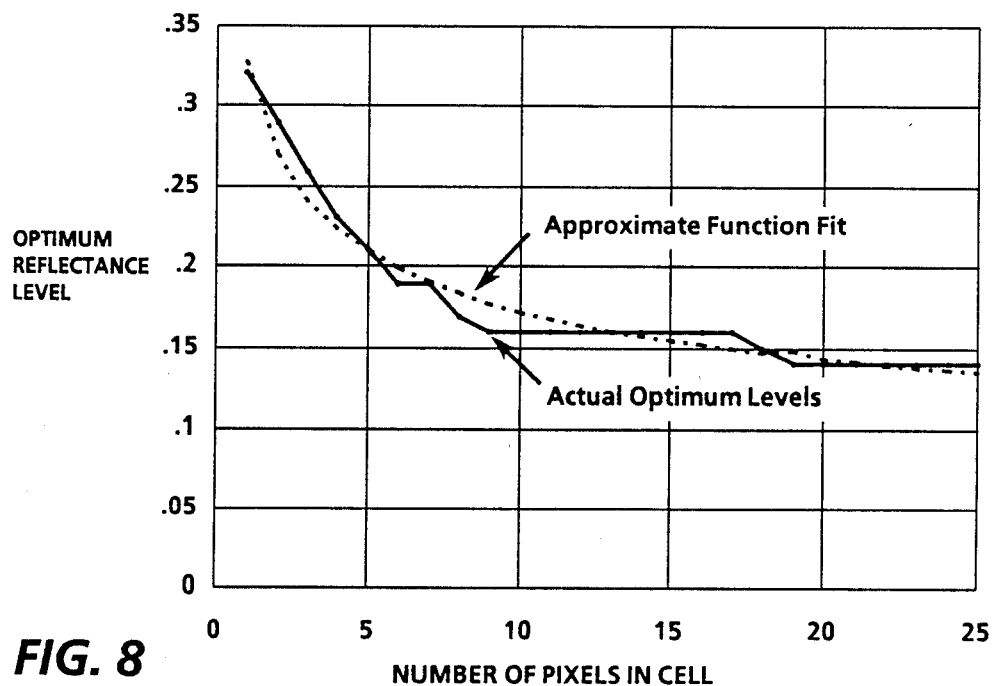
Figure 11:
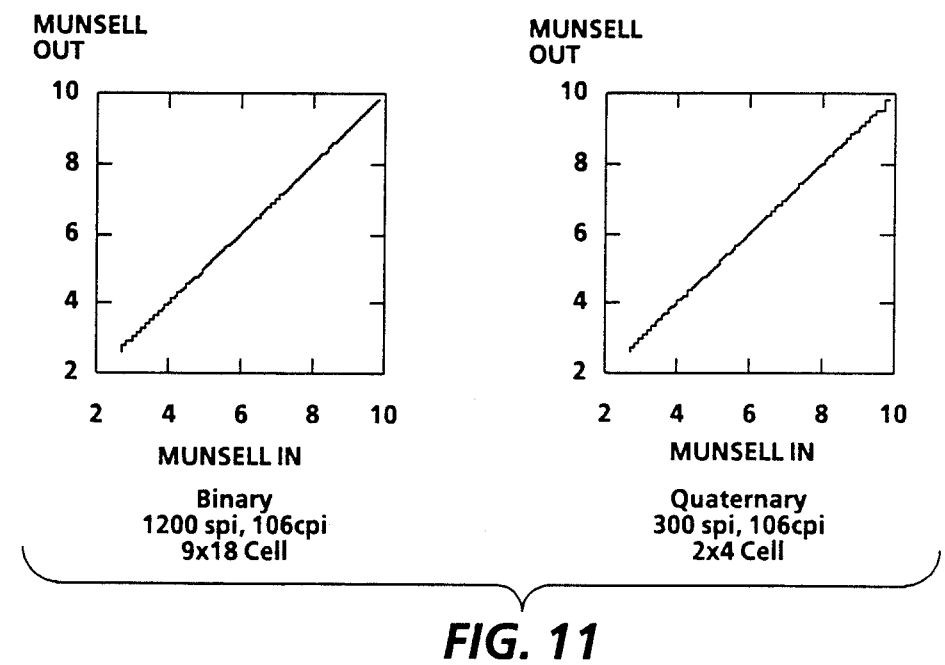
Figure 9:
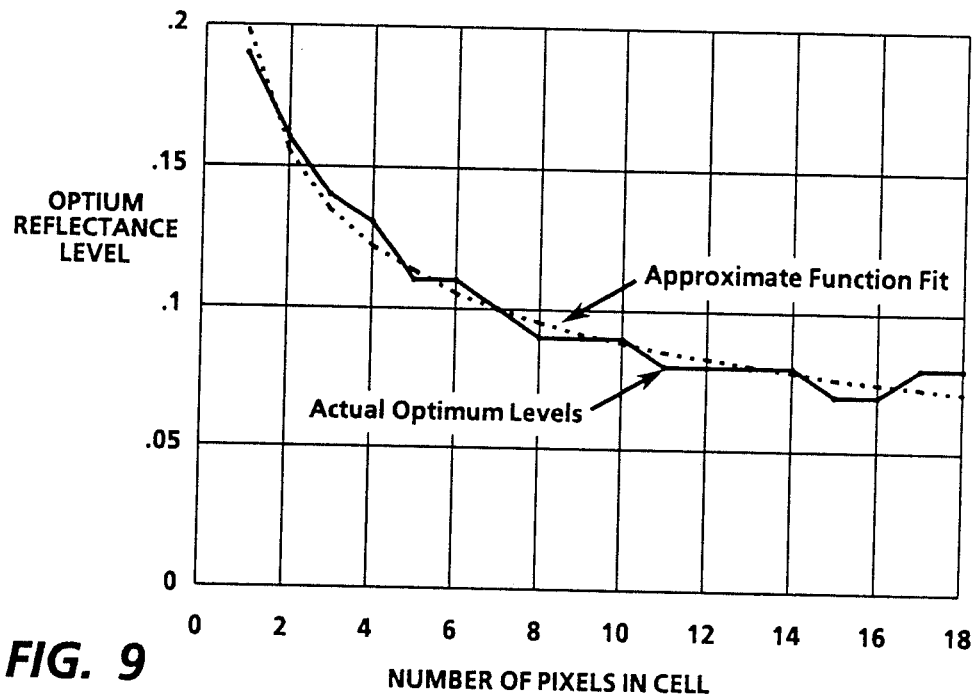
Figure 10:
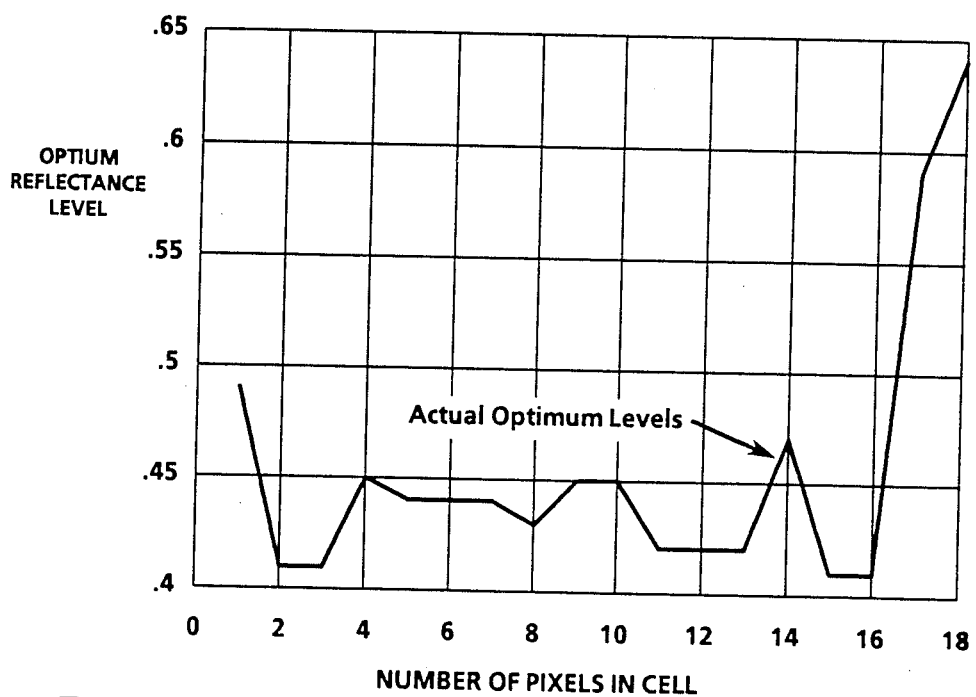

FIGS. 7A, 7B, and 7C are graphical representations depicting the Tone Reproduction Curve for a binary, trinary, and quaternary 2×4 cell following optimization;

FIG. 8 is a graphical representation comparing optimum intermediate pixel reflectance level with the number of pixels in the cell for the trinary case;

FIG. 9 is a graphical representation comparing optimum intermediate pixel reflectance level with the number of pixels in the cell for the dark gray pixel level in the quaternary case;

FIG. 10 is a graphical representation comparing optimum intermediate pixel reflectance level with the number of pixels in the cell for the light gray pixel level in the quaternary case; and FIG. 11 is a graphical representation comparing binary and quaternary systems having an equal number of gray steps in Munsell space.

Figure 1:
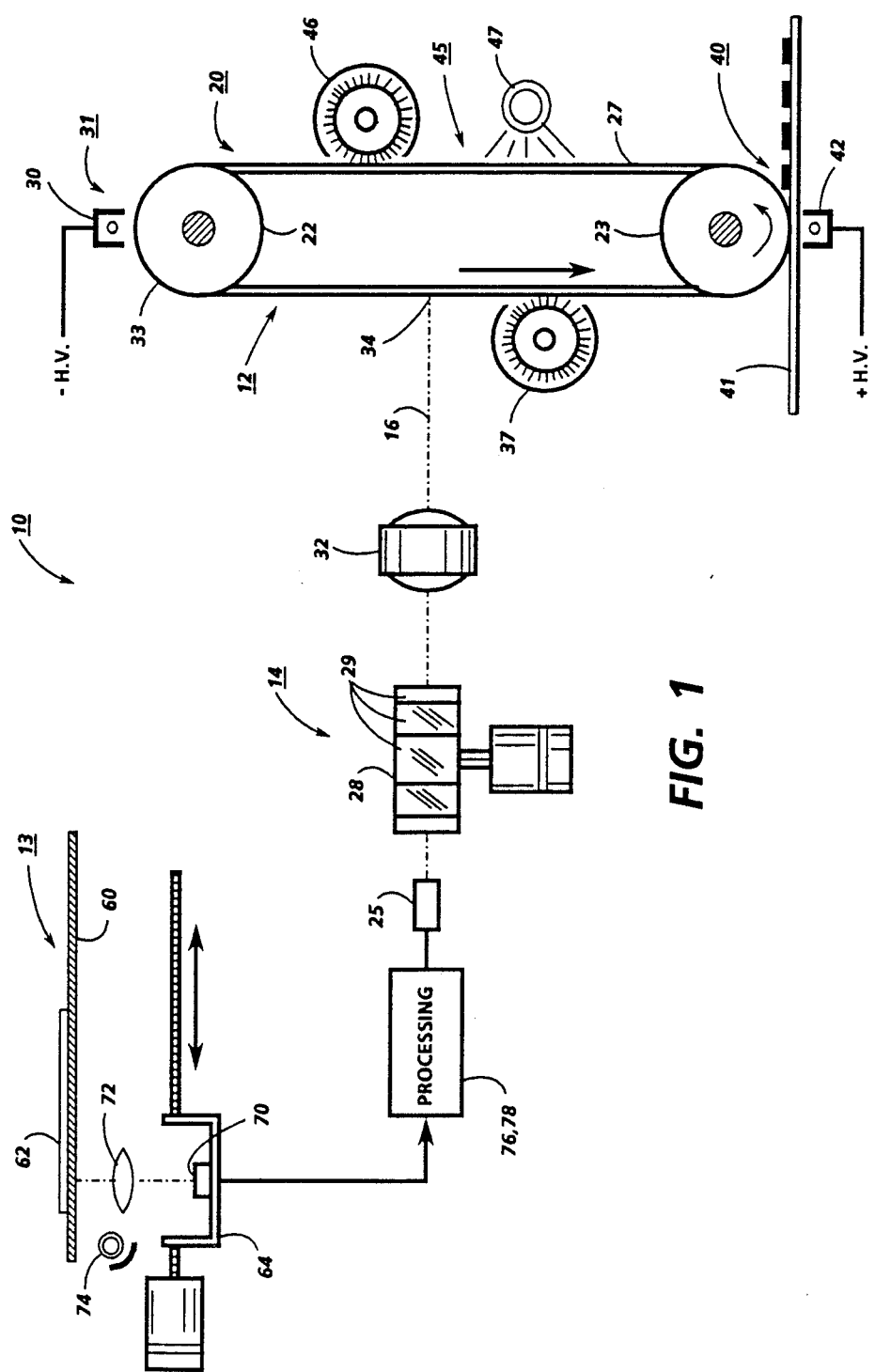
FIG. 1 is a schematic view of a printer incorporating the quaternary system of the present invention for halftone printing.
Figure 2:
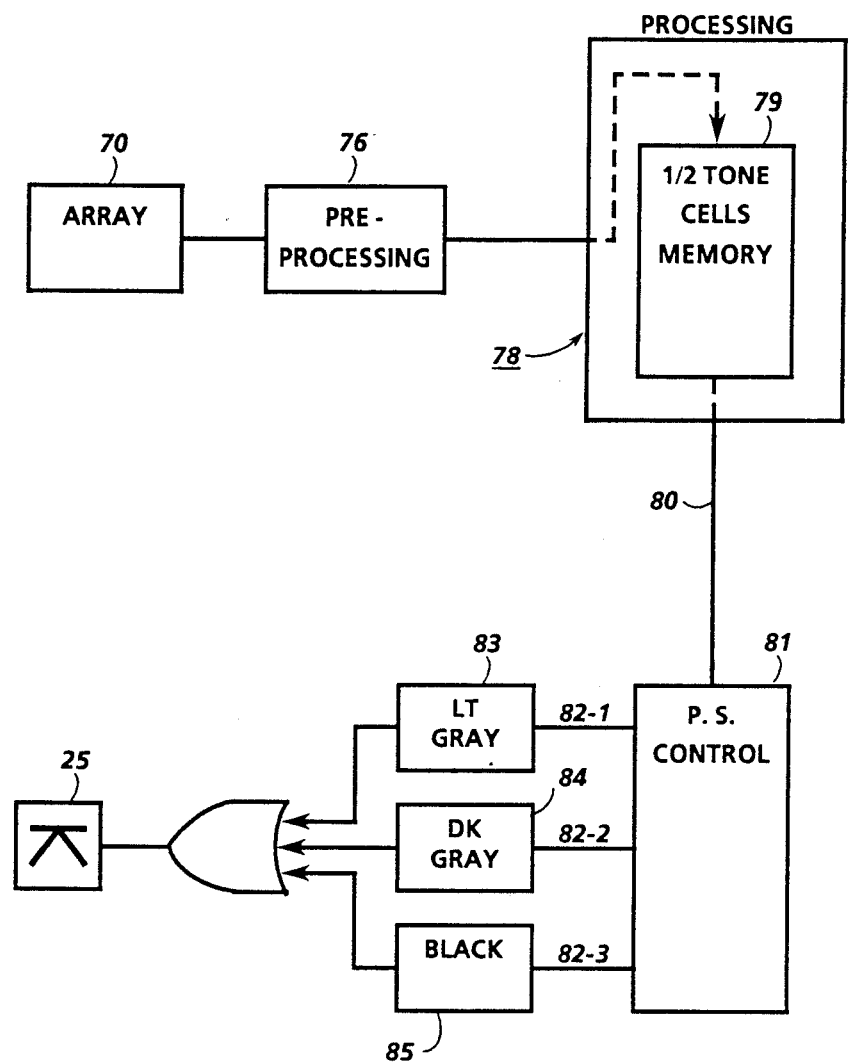
FIG. 2 is a block diagram illustrating the image processing and halftone generating components used with the printers shown in FIG. 1.

Referring particular to FIGS. 1 and 2 of the drawings, there is shown an exemplary electronic printer 10 incorporating the quaternary halftone system of the present invention. Printer 10 includes a xerographic processing section 12, a document scanning section 13, and an image printing section 14, the latter including a variable intensity imaging beam of light 16 for scanning across photoreceptor 20 of xerographic section 12 to provide four level exposure for printing as will appear herein.

Xerographic processing section 12 includes a photoreceptor 20 illustrated herein in the form of an endless belt stretched across drive and idler belt support rollers 22, 23 respectively on which latent electrostatic images representative of the image signal input are created. Belt supporting rollers 22, 23 are rotatably mounted in predetermined fixed position by suitable means (not shown). Roller 23 is driven from a suitable drive motor (not shown) to move photoreceptor 20 in the direction shown by the solid line arrow. While photoreceptor 20 is illustrated in the form of an endless belt, other photoreceptor configurations such as a drum may be envisioned.

Photoreceptor 20 comprises an inner layer or substrate of a suitable flexible electrically conductive substrate with an outer photoconductive layer 27 such as selenium thereupon. Photoreceptor 20 may be opaque, that is, impervious to light or wholly or partially transparent. The exemplary photoreceptor 20 typically has an aluminum substrate which renders the photoreceptor opaque. However, other substrate materials such as glass, may be contemplated which would render photoreceptor 20 wholly or partially transparent. Photoreceptor materials other than selenium as, for example, organic, may also be contemplated. One organic type material, for example, consists of an aluminized Mylar substrate having a layer of selenium dispersed in poly-N-vinyl carbazole with a transparent polymer overcoating containing a charge transport compound such as pyrene.

A corona charging device 30 commonly known as a corotron is operatively disposed adjacent photoreceptor 20 at charging station 31. Corotron 30 which is coupled to a suitable negative high voltage source ($-Hv$) serves to place a uniform negative charge on photoreceptor 20 in preparation for imaging.

Imaging beam 16 of imge printing section 14 is incident on photoreceptor 20 at exposure point 34. Imaging beam 16 is derived from an individual self modulated I.R. diode laser 25, the intensity of beam 16 being at one of three possible levels in the quaternary system described. Beam 16 is swept across photoreceptor 20 by a rotating polygon 28. A suitable lens 32 focuses beam 16 onto photoreceptor 20.

A development subsystem 37 exemplified herein by a magnetic brush roll, is disposed in operative contact with photoreceptor 20 downstream of the contact point 34 of imaging beam 16. Development subsystem 37 includes a suitable developer housing (not shown) within which a supply of developer is provided together with means for loading the developer onto the development subsystem's magnetic brush roll.

The development subsystem preferably comprises a non-scavenging development system using a mono-component developer, the mono-component developer being a relatively small colorant material (referred to as toner). Due to electrostatic forces, the toner is drawn to the latent electrostatic image formed on photoreceptor 20 by imaging beam 16 in proportion to the latent image charge level to develop the image. In the present arrangement, a discharge development system is used wherein, following negative charging of photoreceptor 20 by corotron 30, image areas are discharged by beam 16 in accordance with image signals. The developing toner is negatively charged and is therefore attracted to the discharged image areas while being repelled from the un-discharged areas.

As will be understood, in the development subsystem of this type, when the intensity of beam 16 is at a maximum, maximum development occurs and a black pixel is obtained. When beam 16 is turned off, no development occurs and a white pixel is obtained. In the quaternary system described, two intermediate gray pixel levels are required. These are obtained by providing two intermediate beam intensity levels so that corresponding intermediate amounts of development take place to provide predetermined light gray and dark gray pixels respectively.

Following development of the latent electrostatic image on photoreceptor 20 by developing subsystem 37, the developed image is transferred to a suitable copy or print substrate material 41 such as paper at transfer station 40. To facilitate transfer, a transfer corotron 42 which is coupled to a high voltage power source (+Hv) is provided to attract the developed image on photoreceptor 20 to copy substrate material 41. Following transfer, the developed image is fixed by fusing. Any residual charges and/or developing material left on photoreceptor 20 are removed at cleaning station 45 by erase lamp 47 and cleaning brush 46 respectively.

At document scanning section 13 of printer 10, image data in the form of electrical signals representative of the document reflectance are generated. In the exemplary arrangement shown, document scanning section 13 includes a transparent platen 60 on which a document 62 bearing the image to be processed and printed is placed, either manually or by means of an automatic document handler (not shown). A suitable carriage 64, supported for reciprocating back and forth movement below platen 60, has one or more linear scanning arrays, identified as array 70, mounted thereon. Array 70 may comprise any suitable scanning array type as, for example, a CCD. Carriage 64 is driven by a suitable reversible driver such as a step motor (not shown). Suitable optics, exemplified here by lens 72, focuses array 70 on a line of the image on document 62. A suitable lamp 74 illuminates the document line being scanned by array 70.

Array 70 converts each line of the document image viewed into a succession of analog image signals. The image signals are output to a video pre-processing section 76 where the signals are converted from analog to multi-bit digital image picture elements or pixels representing the document reflectance levels. Pre-processing section 76 and a processing section 78 store and operate on a number of lines of image signals at once. Pre-processing section 76 averages the pixels on a block by block basis to to find an average cell reflectance value, the size of the block processed being equal to the size of the halftone cell. For example, where 2×4 halftone cells are used to process the image signals, each block of pixels processed by pre-processing section 76 would be two lines wide and four pixels long. The average cell reflectance values determined by pre-processing section 76 are output to processing section 78.

Figure 3A:
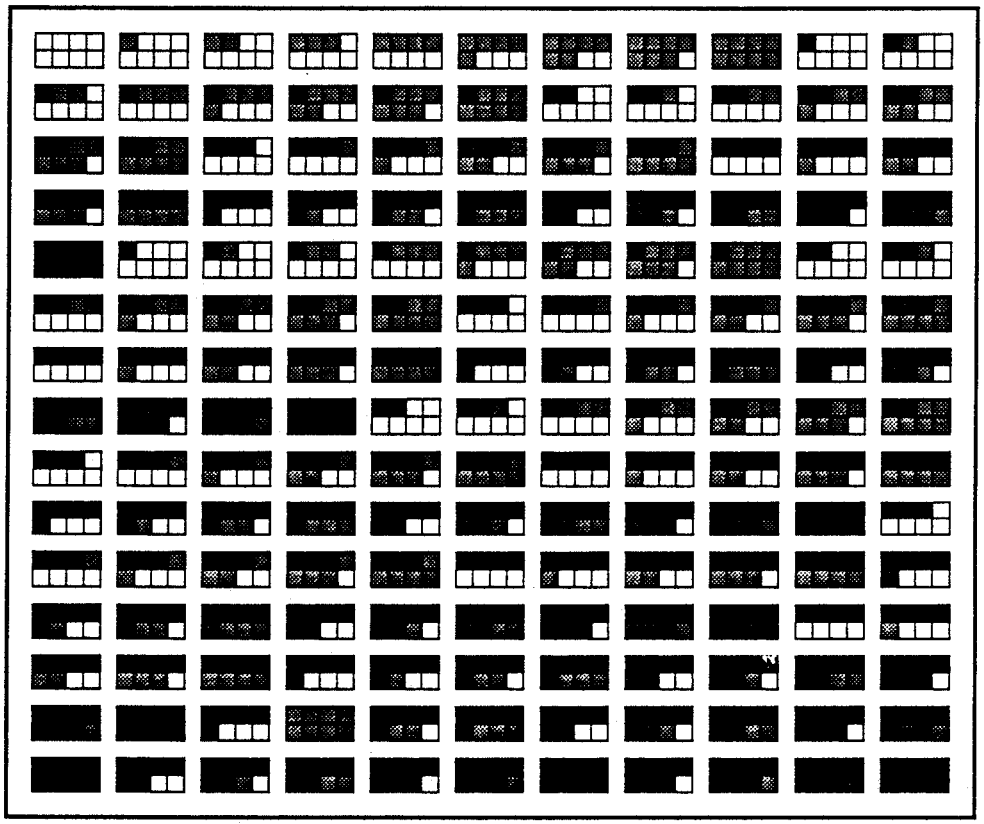
FIG. 3a is a plane view showing a non-redundant 2×4 quaternary pixel halftone cell display providing 165 gray steps.

Processing section 78 includes a memory 79 for storing an array of discrete halftone cells such as shown in FIG. 3a for use in processing the image signals. The average cell reflectance values output by pre-processing section 76, which are in the form of the multi-bit digital image signals, are input to processing section 78. There, the average cell reflectance values are used in a look up table to select the appropriate halftone cells to be printed. Since processing is done on a block by block basis, the halftone cells selected for output are held, for example, in a suitable buffer, at least until processing of the line of pixels is completed.

Figure 3B:
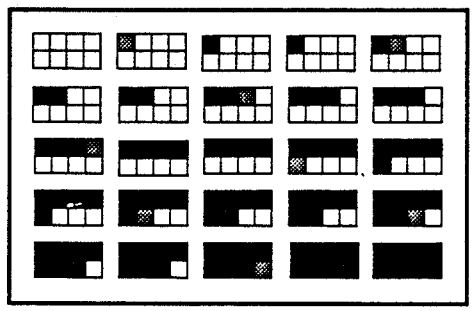
FIG. 3b is a plan view showing a redundant 2×4 quaternary pixel halftone cell display providing 25 gray steps.

In the quaternary system described, each halftone cell selected is made up of various combinations of pixels having one of four possible reflectance levels such as shown in FIGS. 3a and 3b. Processing section 78 outputs to line 80, on a pixel by pixel line by line basis, multi-bit control signals representative of the halftone cells to be printed to power supply control 81. Control 81 responds to the control signal inputs by providing power actuating signals to lines 82-1, 82-2, 82-3 that selectively actuate power supplies 83, 84, 85 respectively.

It is understood that where it is desired to preserve image microstructure, pixels within the halftone cells can be rearranged during processing so as to best correspond to the positions of the original pixels in the block of pixels being processed. This can be accomplished by matching the individual pixel values in each block with the image pixel values in the halftone cell selected. For example, the white pixel(s) in the halftone cell selected would be re-located in the halftone cell to match the location of the whitest pixel(s) in the block of original pixels, the black pixel(s) re-located to match the location of the blackest pixel(s) in the block, the light gray pixel(s) re-located to match the location of the light gray pixel(s) in the block, and the dark gray pixel(s) re-located to match the location of the dark gray pixel(s) in the block.

Power supplies 83, 84, 85 each provide different levels of power output for driving diode laser 25 to expose photoreceptor 20 and provide a latent electrostatic image in accordance with the image content of the image signal output of array 70. In the quaternary system disclosed, power supply 83 provides a first level power input to laser 25 to cause laser 25 to output a beam 16 at a first intensity level corresponding to light gray. Power supply 84 provides a second level power input to laser 25 to cause laser 25 to output a beam 16 at a second intensity level corresponding to dark gray. And, power supply 85 provides a third level power input to laser 25 to cause laser 25 to output a beam 16 at a third intensity level corresponding to black. It will be understood that exposure at the remaining fourth level, i.e. white, in the quaternary system disclosed herein is accomplished through the absence of a control signal to power supplies 83, 84, 85. In that event, diode 25 does not expose photoreceptor 20 so that the charge remaining on photoreceptor 20 at the point of development is insufficient to cause developing by developer 37. As will appear, the halftone cells held in memory 79 of processing section 78 are chosen to provide a series of average gray reflectances which give enhanced image reproduction.

While separate power supplies 83, 84, 85 are shown, it will be understood that any suitable source of power for operating diode 25 at the various intensity levels described may be used.

Where a printer employing the alternate trinary system discussed below is desired, printer 10 may be modified by removing one gray power supply.

In the present invention, the number of average gray reflectances (i.e., gray steps) of an image is significantly increased through the use of gray or intermediate level pixels grouped into selected halftone patterns to enable printing of effectively spatially uninterrupted gradations of gray tones, free of unwanted artifacts like false contours, aliasing and moiré. In a preferred embodiment, a quaternary system of the type described above with two discrete intermediate gray levels of pixels in addition to black and white pixels provides a substantially increased number of gray steps. In a second embodiment, a somewhat simpler trinary system with a single intermediate gray pixel level in addition to black and white pixels is used. As will appear, the quaternary and trinary systems disclosed provide substantially more unique halftone reflectance cells than a binary system of the same cell size. For example, a binary system with a cell size of 18 pixels produced 19 gray steps whereas the trinary and quaternary systems disclosed here produce 190 and 1,330 gray steps respectively. Furthermore, optimum tone reproduction is obtained in the quaternary and trinary systems by the use of optimum intermediate pixel reflectances.

Referring to FIG. 3a, a quaternary system having a 2×4 rectangular cell with pixel reflectances of white, light gray, dark gray, and black is shown. Starting with a cell of entirely white pixels, the proportions of light gray, dark gray, and black pixels are systematically varied to make succeeding cells grow progressively darker and eventually black. As shown, 165 unique reflectance cells are generated without redundancy with only 8 pixels per cell.

As shown in FIG. 3b, the number of halftone cells with unique reflectances is greatly reduced when the cell reflectances that are redundant, i.e. pixel reflectance values are used that evenly divide the reflectance range (e.g., 0, 0.333, 0.667 and 1.0), are removed. The purpose of the invention is to avoid redundant cases, maximize the number of unique reflectance cells, and provide cell reflectances arrayed uniformly along a Tone Reproduction Curve.

An analytical expression for the number (N) of unique halftone cells or distinct gray steps (assuming no redundancy) for a halftone pattern is given by:

$$N = \prod_{k=1}^{r-1} (p+k)/k = (p+r-1)!/p!(r-1)! \quad (1)$$

where
p is pixels per cell; and
r is reflectance levels per pixel.

For a quaternary system in which r=4, the number of gray steps $N_q$ are given by the following relationship:

$$N_q = \sum_{k=1}^{p+1} (p+2-k)k = (p+3)!/6p! = \quad (2)$$

$$(p+3)(p+2)(p+1)/6$$

For a trinary system where r=3, the number of gray steps $N_t$ are given by the following relationship:

$$N_t = \sum_{k=1}^{p+1} k = (p+2)!/2p! = (p+2)(p+1)/2 \quad (3)$$

Examples of the number of gray steps realized by quaternary and trinary systems for a given number of pixels per cell as compared to a conventional binary system are shown in Table 1.

TABLE 1

NUMBER OF GRAY STEPS FOR TRINARY & QUATERNARY SYSTEMS COMPARED WITH A BINARY SYSTEM

| m × n | p | $N_b$ Binary r = 2 | $N_t$ Trinary r = 3 | $N_q$ Quaternary r = 4 |
|---|---|---|---|---|
| 2 × 4 | 8 | 9 | 45 | 165 |
| 3 × 6 | 18 | 19 | 190 | 1330 |
| 4 × 8 | 32 | 33 | 561 | 6545 |

In both the quaternary and trinary systems proposed here, the number of gray steps are related to the halftone cell frequency (cells-per-inch or cpi) and the raster frequency (spots-per-inch or spi). For a typical system, the raster frequency is equal to the inverse of the pixel size, (i.e. spi=$\Delta^{-1}$). Presuming rectangular halftone cells, the halftone cell frequency (cpi) is equal to the inverse of the diagonal cell length (cpi=$L^{-1}$). For example, where rectangular cells are arranged in a diagonal pattern with n=2 m and the number of pixels per cell p=2 $m^2$, the cell diagonal spacing L can be expressed as:

$$L = [(n\Delta/2)^2 + (m\Delta)^2]^{\frac{1}{2}} = 2^{\frac{1}{2}} m\Delta \quad (4)$$

where n is the number of pixels in the cell in the X direction, m is the number of pixels in the cell in the Y direction, and n$\Delta$ and m$\Delta$ are cell lengths.

By rearranging equation 4, a relationship for determining the number of pixels (m) in the Y direction is obtained:

$$m = L/(2^{\frac{1}{2}}\Delta) \quad (5)$$

From equations 4 and 5, the number of pixels per cell p can be determined:

$$p = 2m^2 = (L/\Delta)^2 \quad (6)$$

Since spi=$\Delta^{-1}$ and cpi=$L^{-1}$, equation 6 can be rewritten as follows:

$$p = (spi/cpi)^2 \quad (7)$$

When the number of pixels per cell p, given by equation (7), is inserted into equations 1-3 and 6, expressions for the number of output gray steps in terms of the resolution parameters spi and cpi are obtained. In the binary case, the number of output gray steps is proportional to the square of the raster frequency (spi) and inversely proportional to the square of the halftone frequency (cpi). In the trinary and quaternary cases, these dependencies are much stronger.

Figures 4A, 4B:
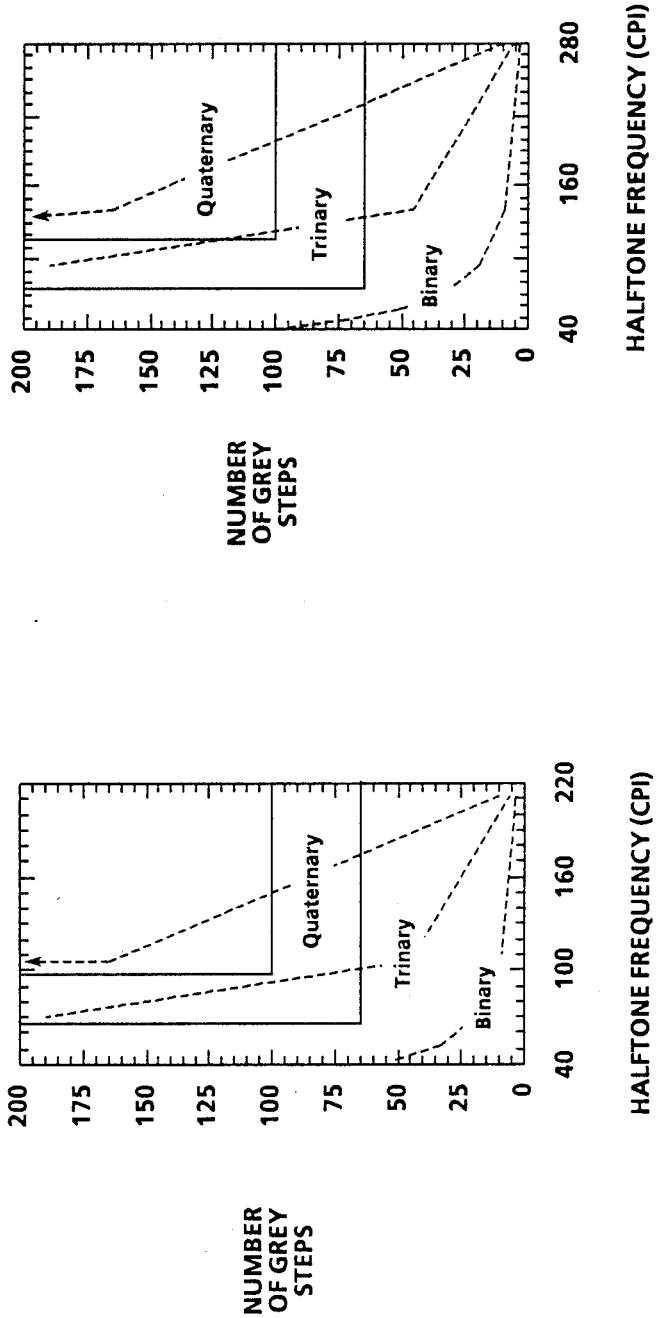
FIG. 4a is a graphical representation comparing the number of gray steps with halftone frequency for 300 spots per inch.
FIG. 4b is a graphical representation comparing the number of gray steps with halftone frequency for 400 spots per inch.

FIGS. 4a and 4b demonstrate the advantages of the quaternary and trinary systems of the present invention as compared to a binary system. There, the number of gray steps versus the halftone frequency for raster frequency examples of 300 spi and 400 spi are plotted for binary, trinary and quaternary systems. The curves were calculated from equations (1)-(4) and (6) above. As is apparent, the binary system does not fall within the acceptable limit of 65 gray steps discussed earlier for either raster frequency. Halftone processing with the single intermediate gray level of the trinary system provides the necessary gray steps to give an acceptable number of gray steps. Halftone processing with the two intermediate gray levels of the quaternary system improves image quality substantially.

The average reflectance of each halftone cell is of significance in determining the effectiveness of halftone processing with either the quaternary or trinary system. The average reflectance of a cell, $R_{ave}$, is a function of the number of pixels at each reflectance level $a_k$, the corresponding reflectance $R_k$ of those pixels, and the number of pixels in the cell p. Where r is the number of levels per pixel, for a rectangular cell, the number of pixels is given by, $$p = \sum_{k=1}^{r} a_k = mn \quad (8)$$

Average cell reflectance $R_{ave}$ is obtained by summing the reflectance $R_k$ of each pixel in the halftone cell and dividing by the number of pixels in the cell:

$$R_{ave} = p^{-1} \sum_{k=1}^{r} a_k R_k \qquad (9)$$

The pixel reflectances $R_k$ discussed above refer to the reflectances of the printed pixels averaged over the nominal pixel size (which is taken to be the raster spacing). Any variation of reflectance within a pixel area is taken to be irrelevant to a human observer because an observer generally cannot see variation within a structure this small. The reflectance of the printed gray pixels may be controlled by several possible mechanisms. The method previously described varies the black dot size or toner pile height within the pixel. The density of a full individual pixel can also be varied by using a multi-development system in which both one or two gray toners and a black toner are provided for selective development.

Figure 5A:
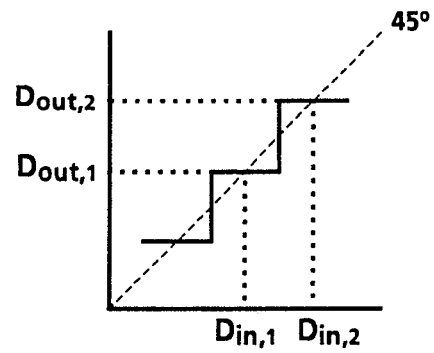
FIG. 5a is a graphical representation of a Tone Reproduction Curve plotted in density space.
Figure 5B:
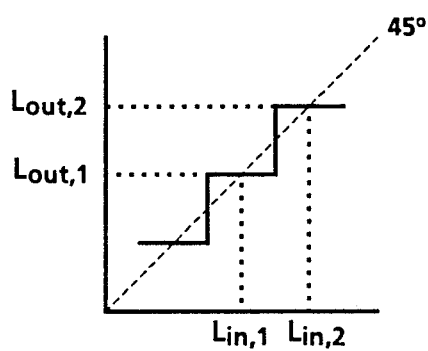
FIG. 5b is a graphical representation of a Tone Reproduction Curve plotted in Munsell space.

The reflectance values $R_{ave}$ obtained from Equation 9 can be manipulated and ordered to give a Tone Reproduction Curve (TRC). Referring to FIG. 5a, the TRC obtained can be plotted as a function of Optical Density Out ($D_{out}$) vs. Optical Density In ($D_{in}$) where density is related to reflectance by $D = -\log_{10} R$. For generating $D_{in} - D_{out}$ plots, it is assumed that, from the array of available halftone cells, a particular cell density $D_{out,i}$ is printed for every $D_{in}$ within a range centered about the central value $D_{in,i}$, where $D_{in,i} = D_{out,i}$. In this way, the $D_{in} - D_{out}$ curves become stepped functions with an average slope of substantially 45° as can be seen in FIG. 5a. A halftone TRC such as this can be produced to lie along a 45° straight line in a digital copier or printer since the original image can be mapped through an appropriate look-up-table prior to halftoning. This look-up-table can also be used to enhance or suppress contrast in a particular gray range. The halftone TRC takes the enhanced image and describes image tone rendition after halftoning. Large steps in the TRC curve results in false contours being printed where the original or enhanced image has a continuous gradation of reflectance.

Tone reproduction curves are generally plotted in density space because the eye's response is approximately linear in density and density is a relatively simple conversion from reflectance. A more accurate response is the Munsell Value, L, which ranges from zero to ten and is approximated by the following relationship (for $R > 0.05$):

$$L = 2.468(100R)^{\frac{1}{3}} - 1.636 \qquad (10)$$

Since the eye's response is substantially linear in this space, equal differences in the Munsell Value (L) will give an equal difference in response throughout the brightness range. This makes the Munsell value (L) the preferred variable for plotting digital TRC's inasmuch as the optimum TRC that minimizes false contouring becomes a stepped function with equal size steps.

Figure 6A:
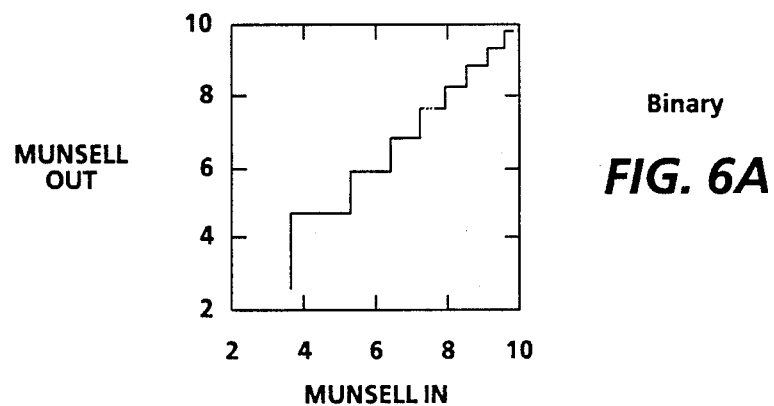
FIGS. 6A, 6B and 6C are graphical representations depicting the Tone Reproduction Curves for a binary, trinary, and quaternary 2×4 cell prior to optimization.
Figure 6B:
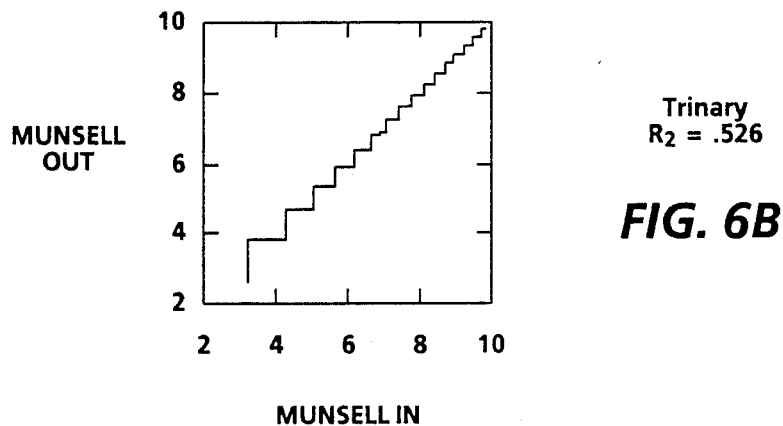
Figure 6C:
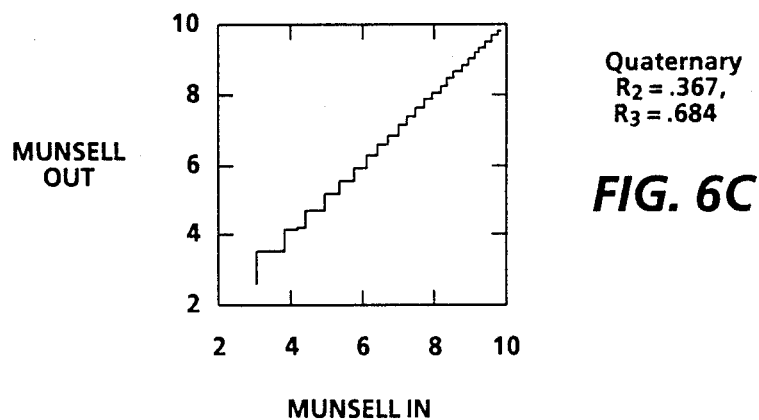

A chosen set of intermediate pixel levels results in a particular TRC. An optimum TRC is obtained when the step size in the graph is minimized. The intermediate pixel levels that allow this are the optimum intermediate levels. FIGS. 6 and 7 show the TRC's with non-optimized and optimized pixel reflectance levels respectively. The white pixel level has been chosen to represent the reflectance of white paper and has been normalized to 1. The black pixel reflectance has been set to the value of 0.05 representative of a maximum density.

The optimum intermediate pixel level depends on the number of pixels (p) in the cell. FIGS. 8, 9 and 10 show the dependence of the optimum intermediate reflectance level on the number of pixels p.

The trinary optimum pixel intermediate level can be found approximately by using the following formula:

$$R_G = (0.3271)(p - 0.2768)T \qquad (11)$$

The quaternary optimum pixel dark and light gray levels can be found approximately by using the following formulas:

$$R_{DG} = (0.1986)(p - 3521)T \qquad (12)$$

$$R_{LG} = (A)(p^{-B})T \qquad (13)$$

where:
for the region $1 < p < 3$, $A = 0.4823$ and $B = -0.1725$;
for the region $4 < p < 10$, $A = 0.4428$ and $B = -0.00004$;
for the region $11 < p < 14$, $A = 0.1543$ and $B = -0.4084$;
for the region $15 < p < 16$, $A = 0.41$ and $B = 0$;
for the region $17 < p < 20$ $A = 0.0211$ and $B = 1.1739$.
T in the formulas 12, 13 is the tolerance over which good tone reproduction is achieved, with best tone reproduction being at $T = 1.0$ over a range of $0.9 \leq T \leq 1.1$.

Table 2 displays examples of optimum intermediate pixel values for $(2 \times 4)$ and $(3 \times 6)$ rectangular cells obtained with the quaternary and trinary systems of the present invention.

TABLE 2

OPTIMUM INTERMEDIATE REFLECTANCE VALUES FOR TRINARY AND QUATERNARY SYSTEMS

| Cell Size | System | Optimum Intermediate Reflectance Value 1 | Optimum Intermediate Reflectance Value 2 |
|---|---|---|---|
| 2 × 4 | Trinary | .172 | — |
| 2 × 4 | Quaternary | .420 | .092 |
| 3 × 6 | Trinary | .152 | — |
| 3 × 6 | Quaternary | .612 | .082 |

As described, multilevel pixels produce a large number of distinct halftone cells even with only a few pixels per cell. Thus for a given halftone frequency, the use of gray pixels allows a printer such as printer 10 to operate at a coarser resolution than in the binary case as demonstrated by FIG. 11 and Table 3. Referring thereto, a printer resolution of only 300 spi in the quaternary system described provides substantially the same tone reproduction as does a binary system operating at a much higher resolution (1200 spi). In FIG. 11, both binary and quaternary systems have the same halftone frequency and the same number of gray steps.

TABLE 3

COMPARISON OF BINARY AND QUATERNARY SYSTEMS

| Case | spi | cpi | # gray steps | pix/in² | bits/in² | bits/sec |
|---|---|---|---|---|---|---|
| Binary | 1350 | 106 | 163 | 1.8 × 10⁶ | 1.8 × 10⁶ | 400 × 10⁶ |
| Quater- | 300 | 106 | 165 | 9.0 × 10⁴ | 0.18 × 10⁶ | 40 × 10⁶ |

TABLE 3-continued

COMPARISON OF BINARY
AND QUATERNARY SYSTEMS

| Case | spi | cpi | # gray steps | pix/in² | bits/in² | bits/sec |
|---|---|---|---|---|---|---|
| nary | | | | | | |

As a result of the lower resolution, the design of the quaternary printer is substantially less difficult. Further, the quaternary and trinary systems of the present invention also allow for significantly reduced data storage requirements and data transmission rates. This is demonstrated by the following equation for determining data storage requirements:

$$\text{bits/inch}^2(\text{pixels/halftone cell}) \times (\text{cells/inch}^2) \times (\text{bits/pixel}) \quad (14)$$

From equation 14, it can be seen for example that a 1350 spi binary system requires 1.8Mbits/inch² of data for storage while a 300 spi quaternary system requires only 0.18Mbits/inch² of data for storage, i.e., the quaternary system requires only one tenth the data of a binary system. This example also demonstrates that the number of bits per square inch does not uniquely determine the pictorial quality when gray pixels are used. Assuming that the required data rate (bits/sec) is obtained with a printing speed of 20 inch/sec and a scan width of 11 inches, the binary system requires 400Mbits/sec while the quaternary system is a more manageable 40Mbits/sec. for the same quality.

The aforedescribed quaternary and trinary systems with optimized pixel intermediate levels of the present invention yield superior tone rendition using smaller halftone cell sizes which reduces the graininess of the image when compared to other known systems. The quaternary and trinary systems described also allow a lower resolution to be used (i.e., fewer spots per inch) which reduces the data storage and data transmission requirements with resultant substantial reduction in cost.

It is understood that while trinary and quaternary levels have been shown and described herein, additional levels (i.e., five levels, six levels, etc.) may be contemplated.

While the invention has been described with reference to the structure disclosed, it is not confined to the details set forth, but is intended to cover such modifications or changes as may come within the scope of the following claims.

We claim:

1. An improved cell structure for use in processing halftone images in a xerographic system of the type in which a latent electrostatic image of the image being printed is created through selective pixel by pixel exposure of a charged photoconductive member in response to image signals, the xerographic system including developer means for developing the latent electrostatic image on said photoconductive member to provide a visible image for transfer to a print material, comprising:

(a) a cell having p pixels;
(b) said pixels being arranged in a predetermined pattern so that said cell when viewed in its entirety provides, following development of said p pixels by said developer means, a preset average reflectance level for processing image signals;
(c) said p pixels including pixels of at least three separate charge levels so that following development by said developer means, pixels of at least three different reflectance levels are included in said cell of p pixels,
(d) a first of said pixel reflectance levels being white;
(e) a second of said pixel reflectance levels being black; and
(f) a third of said pixel reflectance levels being gray; and
(g) the optimum reflectance level $R_W$ for said white pixel reflectance level being equal to 1 while the optimum reflectance level $R_B$ for said pixel reflectance level is approximately by:

$$R_B = (0.05)(R_W).$$

2. The structure according to claim 1 in which the optimum reflectance level $R_G$ for said gray pixel reflectance level is:

$$R_G = (0.3271)(p - 0.2768)T.$$

3. An improved cell structure for use in processing halftone images in a xerographic system of the type in which a latent electrostatic image of the image being printed is created through selective pixel by pixel exposure of a charged photoconductive member in response to image signals, the xerographic system including developer means for developing the latent electrostatic image on said photoconductive member to provide a visible image for transfer to a print material, comprising:

(a) a cell having p pixels;
(b) said pixels being arranged in a predetermined pattern so that said cell when viewed in its entirety provides, following development of said p pixels by said developer means, a preset average reflectance level for processing image signals;
(c) said p pixels including pixels of at least three separate charge levels so that following development by said developer means, pixels of at least three different reflectance levels are included in said cell of p pixels,
(d) a first of said pixel reflectance levels being white;
(e) a second of said pixel reflectance levels being black;
(f) a third of said pixel reflectance levels being a first gray level;
(g) a fourth of said pixel reflectance levels being a second gray level;
(h) the optimum reflectance level $R_W$ for said white pixel reflectance level being equal to 1,
(i) the optimum reflectance level $R_B$ for said black pixel reflectance level being:

$$R_B = (0.05)(R_W)$$

(j) the optimum reflectance level $R_G$ for said first gray pixel reflectance level being approximated by:

$$R_G = (0.1986)(p - 0.3521)T \text{ and,}$$

(k) the optimum reflectance level $R_{G2}$ for said second gray pixel reflectance level being approximated by:

$$R_{G2} = = (A)(p^{-B})T.$$

4. In an image reproduction system, the combination of:

(a) image data input means for scanning an original image and providing an input array of image data corresponding to the image gray scale levels of the picture element locations of said original image;

(b) processing means for receiving said input array of image data and using preset blocks of said image data, computing an output array of image print values, each of said print values corresponding to one of a fixed number of gray scale values;

said processing means including memory means addressable by said image print values having a predetermined one of said gray scale values for each of said image print values, said memory means comprising an array of halftone cells adapted to provide a stepwise series of reflectance levels through a succession of intermediate levels ranging from white to black;

each of said cells having a plurality of pixels;

said pixels having either a uniformly white, black, or gray reflectance level;

the ratio of pixels having said gray reflectance level to said pixels having either said black or white reflectance level in each of said cells being chosen to provide a step by step changing series of average reflectance levels ranging from white to black in said array of half tone cells; and (c) printing means capable of printing picture elements, each of said picture elements having a reflectance or brightness level corresponding to one of said uniformly white, black, or gray reflectance levels whereby to print said array of image print values corresponding to said gray scale values.

5. The system according to claim 4 in which said halftone cells comprise pixels having uniformly white, black, first gray, and second gray reflectance levels.

6. The system according to claim 4 in which said print means includes:
  (a) a uniformly charged photoreceptor;
  (b) a laser beam for exposing said photoreceptor;
  (c) means for focusing said beam to a spot on said photoreceptor;
  (d) means for scanning said spot repeatedly across said photoreceptor while moving said photoreceptor in a direction transverse thereto; and
  (e) means for controlling the intensity of said beam to provide discrete exposure levels corresponding to pixels having said white, black, and gray intensity levels.

7. The system according to claim 5 in which said print means includes:
  (a) uniformly charged photoreceptor;
  (b) a laser beam for exposing said photoreceptor;
  (c) means for focusing said beam to a spot on said photoreceptor;
  (d) means for scanning said spot repeatedly across said photoreceptor while moving said photoreceptor in a direction transverse thereto; and
  (e) means for controlling the intensity of said beam to provide discrete exposure levels corresponding to pixels having said white, black, first gray, and second gray intensity levels.

8. In a printing machine, the combination of:
  (a) a recording member;
  (b) exposure means for exposing said recording member at least three discrete charge levels to form latent electrostatic images on said recording member;
  (c) a source of image signals;
  (d) developing means for developing the latent electrostatic images formed on said recording member to provide image forming dots of uniform white, gray, and black reflectances corresponding to each of said three charge levels;
  (e) means for converting said image signals to a digital representation of image intensity;
  (f) memory means having a plurality of halftone cells, each of said cells in said memory means being formed by pixels having discrete combinations of said first, second, and third intensity levels, said pixel combinations cooperating to provide a succession of said halftone cells with a cell intensity ranging in closely stepped fashion from light to dark reflectances; and
  (g) means for addressing individual ones of said halftone cells in said memory means with predetermined blocks of said digital representations to provide image printing signals composed of a corresponding succession of said halftone cells to said exposure means whereby said exposure means exposes said recording member pixel by pixel in response to said image printing signals to form the latent electrostatic image represented by said image signals composed of said halftone cells on said recording member for developing by said developing means.

9. The method of making a halftone image reproduction, comprising the steps of:
  (a) scanning an image and in timed relation therewith generating image signals representative of the density of successively viewed elemental areas within said image,
  (b) translating said image signals into a corresponding sequences of binary words having information bits arranged in correspondence with an arrangement of marking cells within a two-dimensional marking matrix which when viewed by an observer will give a visual impression approximating that of the associated elemental area within said image;
  (c) forming each of said marking cells by addressing a memory having a plurality of pixels having first, second, third, and fourth predetermined signal levels corresponding to white, first gray, second gray, and black reflectances respectively using said sequences of binary words;
  (d) producing relative scanning movement in a predetermined second pattern while selectively marking an image receiving member to provide discrete first, second, third, and fourth charge levels corresponding to said first second, third and fourth signal levels; said second pattern successively marking all members of a field of marking cells collectively defining a contiguous set of two dimensional marking matrices for halftone reproduction of the master image; and
  (e) developing said image receiving member in response to said first, second, third and fourth charge levels to provide corresponding white, first gray, second gray, and black reflectances and a succession of said two dimensional marking cell representations of said halftone image reproduction.

* * * * *